(12) United States Patent
Qi (10) Patent No.: US 10,324,977 B2
(45) Date of Patent: Jun. 18, 2019

(54) SEARCHING METHOD AND APPARATUS

(71) Applicant: BAIDU ONLINE NETWORK TECHNOLOGY (BEIJING) CO., LTD., Beijing (CN)

(72) Inventor: Hui Qi, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/616,451

(22) Filed: Jun. 7, 2017

(65) Prior Publication Data

US 2018/0181594 A1    Jun. 28, 2018

(30) Foreign Application Priority Data

Dec. 22, 2016 (CN) .......................... 2016 1 1198641

(51) Int. Cl.
  *G06F 16/00* (2019.01)
  *G06F 16/583* (2019.01)
  *G06K 9/68* (2006.01)

(52) U.S. Cl.
  CPC ...... *G06F 16/5838* (2019.01); *G06F 16/5846* (2019.01); *G06K 9/6857* (2013.01)

(58) Field of Classification Search
  CPC ........... G06F 17/30256; G06F 17/3025; G06F 17/30253; G06F 17/30259; G06K 9/00288; G06K 9/3258; G06K 9/38; G06K 9/6215

USPC ........................................................ 382/118
See application file for complete search history.

(56) References Cited

U.S. PATENT DOCUMENTS

2006/0224587 A1 * 10/2006 Zamir ............... G06F 17/30867
2016/0217157 A1 * 7/2016 Shih .................. G06F 17/30256

FOREIGN PATENT DOCUMENTS

CN         105518678      *  4/2016
CN         105518678  A     4/2016

* cited by examiner

*Primary Examiner* — Ping Y Hsieh
(74) *Attorney, Agent, or Firm* — Lathrop Gage LLP (57) ABSTRACT

The present disclosure discloses a searching method and apparatus. A specific embodiment of the searching method comprises: receiving a search request sent by a client, the search request including a target picture; analyzing the target picture to extract text information and an image characteristic; matching the text information with text information of each preset picture in a preset picture set to determine a first similarity, matching the image characteristic with an image characteristic of the preset picture in response to the first similarity greater than a first preset threshold, and determining whether the preset picture is determined as an identical picture based on matching results; and acquiring associated information of the identical picture, sending the identical picture and the associated information as a search result to the client to be displayed on the client. The present embodiment improves the search efficiency and reduces the labor cost of the search.

9 Claims, 5 Drawing Sheets

SEARCHING METHOD AND APPARATUS

CROSS-REFERENCE TO RELATED APPLICATION

This application is related to and claims priority from Chinese Application No. 201611198641.8, filed on Dec. 22, 2016, entitled "A Searching Method and Apparatus" the entire disclosure of which is hereby incorporated by reference.

TECHNICAL FIELD

The present disclosure relates to the field of computer, specifically to the field of Internet technology, and more specifically to a method and apparatus for generating search report.

BACKGROUND

With the development of Internet technology, infringing use of Internet pictures is becoming more and more serious. In order to determine if the use of a picture constitutes an infringement, it is usually necessary to search the picture on the Internet.

The conventional picture searching method is usually based on the user's description of the picture, by conducting a manual search, and comparing and gathering evidence on the Internet. Thus, this searching method leads to high cost and low efficiency of the search. When there are many pictures to be searched, it also leads to higher labor cost.

SUMMARY

The objective of the present disclosure is to provide an improved searching method and apparatus, in order to solve the technical problem mentioned in the foregoing Background section.

In a first aspect, the present disclosure provides a searching method, comprising: receiving a search request sent by a client, wherein the search request includes a target picture; analysing the target picture to extract text information and an image characteristic; matching the text information with text information of each preset picture in a set of preset pictures to determine a first similarity, and in response to a preset picture having the first similarity greater than a first preset threshold, matching the image characteristic with an image characteristic of the preset picture to determine whether the preset picture is an identical picture; and acquiring associated information of the preset picture determined as the identical picture, sending the identical picture and the associated information to the client as a search result to be displayed on the client.

In some embodiments, the image characteristic is provided with an auxiliary characteristic identifier, wherein the auxiliary characteristic identifier comprises at least one of the following: a color characteristic identifier, a texture characteristic identifier, a shape characteristic identifier, a size characteristic identifier; and wherein, in response to a preset picture having the first similarity greater than the first preset threshold, matching the image characteristic with an image characteristic of the preset picture includes: for each preset picture having the first similarity greater than the first preset threshold, matching the auxiliary characteristic identifier of the target picture with the auxiliary characteristic identifier of the preset picture to determine a second similarity.

In some embodiments, the determining whether the preset picture is determined as an identical picture based on a matching result, including: determining the preset picture with the second similarity greater than a second preset threshold as the identical picture.

In some embodiments, the image characteristic is also provided with a human face characteristic identifier; and in response to a preset picture having the first similarity greater than the first preset threshold, matching the image characteristic with an image characteristic of the preset picture comprises: for each preset picture having the second similarity not greater than the second threshold and greater than a third preset threshold, matching the human face characteristic identifier of the target picture with the human face characteristic identifier of the preset picture to determine a third similarity.

In some embodiments, the determining whether the preset picture is determined as the identical picture based on a matching result comprises: determining the preset picture with the third similarity greater than a fourth preset threshold as the identical picture.

In some embodiments, the associated information includes at least one of the following: a user name, a number of users, a usage address, and a frequency of use.

In some embodiments, before the receiving a search request sent by a client, the method further comprises: receiving a user login request sent by the client, wherein the user login request includes a user identifier; and obtaining history search information of the user indicated by the user identifier, and sending the history search information to the client.

In a second aspect, the present disclosure provides a searching apparatus, comprising: a first receiving unit, configured to receive a search request sent by a client, wherein the search request includes a target picture; an analysing unit, configured to analyse the target picture to extract text information and an image characteristic; a matching unit, configured to match the text information with text information of each preset picture in a set of preset pictures to determine a first similarity, and in response to a preset picture having the first similarity greater than a first preset threshold, matching the image characteristic with an image characteristic of the preset picture to determine whether the preset picture is an identical picture; a first sending unit, configured to acquire associated information of the preset picture determined as the identical picture, sending the identical picture and the associated information to the client as a search result to be displayed on the client.

In some embodiments, the image characteristic is provided with an auxiliary characteristic identifier, wherein the auxiliary characteristic identifier comprises at least one of the following: a color characteristic identifier, a texture characteristic identifier, a shape characteristic identifier, a size characteristic identifier; and the matching unit is further configured to: for each preset picture with the first similarity greater than the first preset threshold, matching the auxiliary characteristic identifier of the target picture with the auxiliary characteristic identifier of the preset picture to determine a second similarity.

In some embodiments, the matching unit is further configured to: determine the preset picture with the second similarity greater than a second preset threshold as the identical picture.

In some embodiments, the image characteristic is also provided with a human face characteristic identifier; and the matching unit is further configured to: for each preset picture having the second similarity not greater than the second threshold and greater than a third preset threshold, matching the human face characteristic identifier of the target picture with the human face characteristic identifier of the preset picture to determine a third similarity.

In some embodiments, the matching unit is further configured to: determine the preset picture with the third similarity greater than a fourth preset threshold as the identical picture.

In some embodiments, the associated information includes at least one of the following: a user name, a number of users, a usage address, and a frequency of use.

In some embodiments, the apparatus further comprises: a second receiving unit, configured to receive a user login request sent by the client, wherein the user login request includes a user identifier; and a second sending unit, configured to obtain history search information of the user indicated by the user identifier, and sending the history search information to the client.

By analysing the target picture in the search request to extract the text information and the image characteristic, matching the text information and the image characteristic of the target picture and the preset picture to determine the identical picture, and lastly acquiring the associated information of the identical picture and sending the identical picture and the associated information as the search result to the client so that the client may display the search result, the searching method and apparatus provided by the present disclosure do not require the user to manually search and match the target picture, thereby improving the search efficiency and reducing the labor cost of the search.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
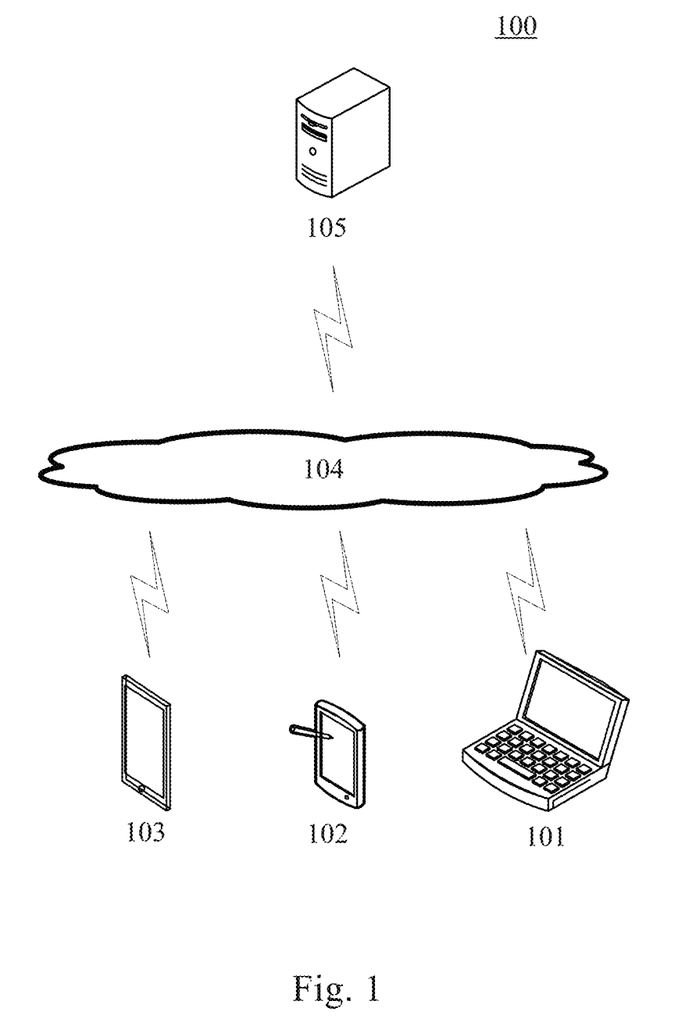
FIG. 1 is an exemplary system architecture diagram in which the present disclosure may be applied.

FIG. 1 shows an exemplary architecture of a system 100 which may be used by a method and apparatus for generating search report according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the servers 105, 106 through the network 104, in order to transmit or receive messages, etc. Various communication client applications, such as web browser applications, shopping applications, search applications, instant messaging tools, mailbox clients, social platform software, may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The servers 105 and 106 may be virtual machines in a virtual machine cluster providing various services, for example, virtual machines in the backend webpage virtual machine cluster provide support for displaying webpages on the terminal devices 101, 102 or 103. The backend webpage virtual machine cluster may perform a corresponding processing on data according to the received webpage request, and return a processing result (for example, webpage data) to the terminal devices.

It should be noted that the method for elastically scaling a virtual machine cluster according to the embodiments of the present application is generally executed by the virtual machine cluster including the virtual machines 105 and 106, and accordingly, an apparatus for elastically scaling a virtual machine cluster is generally installed on the virtual machine cluster including the virtual machines 105 and 106.

It should be appreciated that the numbers of the terminal devices, the networks and the virtual machines in the virtual machine cluster in FIG. 1 are merely illustrative. Any number of terminal devices, networks and virtual machines may be provided based on the actual requirements.

Figure 2:
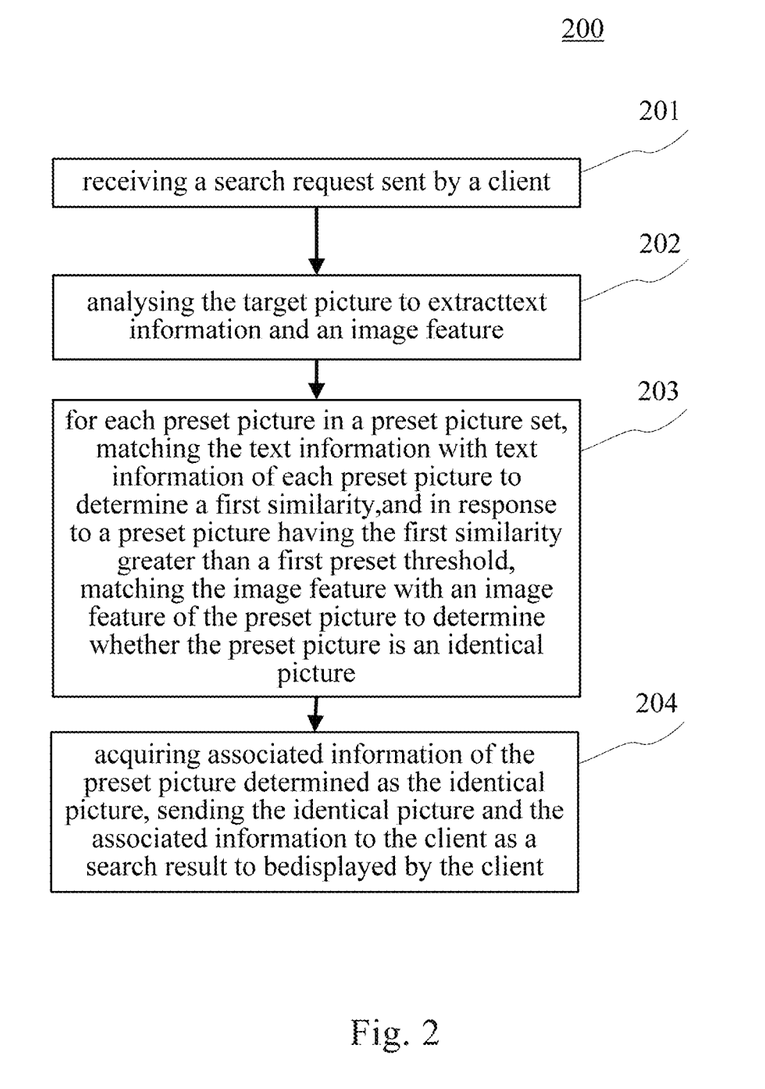
FIG. 2 is a flowchart of an embodiment of a searching method according to the present disclosure.

With further reference to FIG. 2, a flow 200 of an embodiment of the searching method according to the present disclosure is shown.

Step 201, receiving a search request sent by a client.

In the present embodiment, an electronic device (e.g., the server 105 as illustrated in FIG. 1) on which the search report generating method operate may acquire, by means of wired connection or wireless connection, receives a search request from a client used by the user for web browsing (e.g., the terminal devices 101, 102, 103 shown in FIG. 1), wherein the search request may include the target picture. Here, the target picture may be one or a plurality of pictures. It is to be noted that the wireless connection may include, but is not limited to, 3G/4G connection, WiFi connection, bluetooth connection, WiMAX connection, Zigbee connection, UWB (ultra wideband) connection, and other wireless connections known by now or to be developed in the future.

In practice, the client may be installed with a search application. The user may first open the search application and upload a picture; after that, the uploaded picture is selected, the selected picture is determined as the target picture, and the search button in the interface of the search application is clicked to send a search request based on the target picture to the server.

Step 202, analysing the target picture to extract text information and an image characteristic.

In the present embodiment, the electronic device may analyse the target picture in a variety of ways to extract the text information and the image characteristic. Wherein the text information may include characters and comments (or information such as words in the target picture, keywords extracted from the comments, etc.) in the target picture, and may also include character strings generated by analysing the target picture, for characterizing the content of the target picture, such as "sunset", "ocean", etc.; the image characteristic may include but is not limited to a color characteristic, a texture characteristic, a shape characteristic, a size characteristic, a spatial relationship characteristic, etc. For example, the electronic device may use the OCR (Optical Character Recognition) technology to analyze the target picture and extract the text information. First, the electronic device may perform a luminance detection on the target image to detect a dark and bright pattern of a plurality of regions of the target picture, and further determine a character shape. After that, the electronic device may use a character recognition method (for example, the European-style spatial comparison method, the dynamic procedure comparison method, the character matching method based on neural network, etc.) to translate character shapes into computer text. As another example, the electronic device may use the convolutional neural network to analyse the target picture, identify the content of the target picture, and generate a character string for characterizing the content. In this case, the pre-trained image recognition model may be stored in advance in the electronic device, and the image recognition model may be established based on the convolutional neural network and pre-trained. The electronic device may input the target picture into the image recognition model to obtain the text information of the target picture.

In some alternative implementations of the present embodiment, the electronic device may generate a color histogram of the target picture and use the color histogram as an image characteristic. In practice, the color histogram may represent the proportion of different colors in the target picture, which is usually used to characterize the color characteristics of the image. Specifically, the electronic device may divide the color space into a plurality of color intervals and perform a color quantization. After that, the number of pixels in each color interval of the target picture is calculated to generate a color histogram. It should be noted that the color histogram may be generated based on various color spaces, for example, RGB (red green blue) color space, HSV (hue saturation value) color space, HSI (hue saturation intensity) color space, etc. The respective color intervals in the color histogram of the target picture may have different values in different color spaces.

In some alternative implementations of the present embodiment, the electronic device may extract a grayscale co-occurrence matrix from the target picture using the grayscale co-occurrence matrix algorithm, and determine the grayscale co-occurrence matrix as an image characteristic. In practice, the grayscale co-occurrence matrix may be used to characterize information such as the texture direction, adjacent interval, change amplitude, etc. in the image.

In some alternative implementations of the present embodiment, the electronic device may first divide the target picture, divide the color regions included in the target picture, and then index the divided color regions to extract the spatial relationship characteristic of the target picture. Alternatively, the electronic device may evenly divide the target picture into a plurality of target picture sub-blocks, then extract the image characteristic of each target picture sub-block, and index the extracted image characteristic to extract the spatial relationship characteristic of the target picture.

It should be noted that the electronic device may also be based on an arbitrary image characteristic extraction method (or an arbitrary combination of a plurality of image characteristic extraction methods) such as the Hough transform, the random field construction model, the Fourier shape descriptor method, the constructing image grayscale gradient direction matrix to extract the image characteristic of the target image. In addition, the extracting of the image characteristic is not limited to the above-mentioned methods.

It should be noted that the above optical character recognition technology, the convolutional neural network and the image characteristic extraction method are well-known technologies which are widely studied and applied at present so that detailed description thereof is omitted.

Step 203, matching the text information with text information of each preset picture in a preset picture set to determine a first similarity, matching the image characteristic with an image characteristic of the preset picture in response to the first similarity greater than a first preset threshold, and determining whether the preset picture is determined as an identical picture based on a matching result.

In the present embodiment, the electronic device may be provided with a picture database in advance, and the preset picture set may be stored in the picture database; furthermore, the preset picture set may also be installed in a remote database connected to the electronic device. The electronic device may extract the preset picture set from a local database or the remote database in advance. It should be noted that the database for storing the preset picture set may also store the text information and the image characteristic of each preset picture in the preset picture set.

In the present embodiment, the electronic device may first match the text information of the target picture with the text information of the preset picture in a set of preset pictures by using various similarity calculation methods, to determine the first similarity, i.e., the similarity between the text information of the target picture and the text information of the preset picture. For example, the electronic device may perform the similarity calculation between the text information based on the cosine theorem, the Euclidean distance, the Jekard's similarity measure method, etc. After that, the electronic device may match the image characteristic of the target picture with the image characteristic of the preset picture by using various image characteristic matching methods in response to the first similarity greater than the first preset threshold, and determine whether the preset picture is determined as an identical picture based on the matching result. For example, the matching of the image characteristics may be characteristic matching based on the local region grayscale statistics characteristic, or characteristic matching based on the Euclidean distance, the Mahalanobis distance, etc.

In some alternative implementations of the present embodiment, the image characteristics of the target picture and the preset picture may be provided with an auxiliary characteristic identifier, wherein the auxiliary characteristic identifier includes at least one of the following: a color characteristic identifier, a texture characteristic identifier, a shape characteristic identifier, a size characteristic identifier and a spatial relationship characteristic identifier. In practice, the color characteristic identifier, the texture characteristic identifier, the shape characteristic identifier, the size characteristic identifier and the spatial relationship characteristic identifier may be used to distinguish and characterize the color characteristic, texture characteristic, shape characteristic, size characteristic and spatial relationship characteristic of the picture respectively. The auxiliary characteristic identifier may be composed of any character string, such as numbers, letters, words, symbols, a combination of numbers and letters, a combination of words and numbers, etc. It should be noted that the color characteristic identifier, the texture characteristic identifier, the shape characteristic identifier, the size characteristic identifier and the spatial relationship characteristic identifier of the target picture and each preset picture may be plural.

In some alternative implementations of the present embodiment, the matching of the image characteristic of the target picture with the image characteristic of each preset picture may be implemented by matching the auxiliary characteristic identifier of the picture with the auxiliary characteristic identifier of the preset picture. Specifically, the electronic device may calculate the coincidence rate of the auxiliary characteristic identifier of the picture to the auxiliary characteristic identifier of the preset picture, and determine the coincidence rate as the second similarity. Wherein the coincidence rate may be the ratio of the number of the identical auxiliary characteristic identifiers to the total number of the auxiliary characteristic identifiers of the preset picture, or the ratio of the number of the identical or similar auxiliary characteristic identifiers to the total number of the auxiliary characteristic identifiers of the preset picture. The electronic device may determine the preset picture as the identical picture in response to the second similarity greater than the second preset threshold.

In some alternative implementations of the present embodiment, the electronic device may perform an update of the preset picture set at a preset time interval (e.g., 12 hours, 24 hours, one week, etc.). For example, adding or deleting preset picture from the preset picture set. In addition, after updating the preset picture set, for each new preset picture added in the preset picture set, the electronic device may analyse the preset picture, and extract the text information and the image characteristic of the preset picture.

It should be noted that the above similarity calculation method and the image characteristic matching method are well-known technologies which are widely studied and applied at present so that detailed description thereof is omitted.

Step 204, acquiring associated information of the identical picture, sending the identical picture and the associated information as a search result to the client so that the client displays the search result.

In the present embodiment, the electronic device may obtain the associated information of the identical picture determined in step 203 from the local database or the remote database storing the preset picture set, and send the identical picture and the associated information as a search result to the client so that the client displays the search result. Here, the associated information may be various information related to the identical picture. For example, the association information may include attribute information (e.g., pixel, format, bit depth, size, etc. of the identical picture) of the identical picture, and may also include similarity information of the identical picture with the target picture (e.g., the first similarity, the second similarity, etc.)

In some alternative implementations of the present embodiment, the associated information may also include at least one of the following: the user name, the number of users, the usage address and the frequency of use of the identical picture.

In practice, after receiving the search result, the client may present the search result according to the pattern preset in the default template of the client. In addition, the user may select a specific template in the user interface of the search application installed by the client, and render the search report in the form of the template to the client.

Figure 3A:
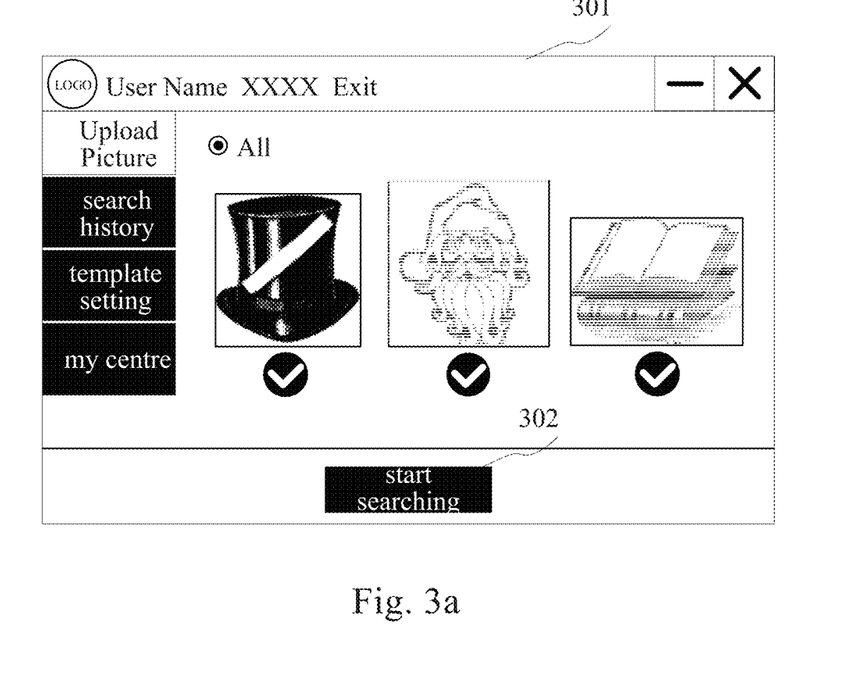
FIGS. 3a to 3b are schematic diagrams of an application scenario of the searching method according to the present disclosure.
Figure 3B:
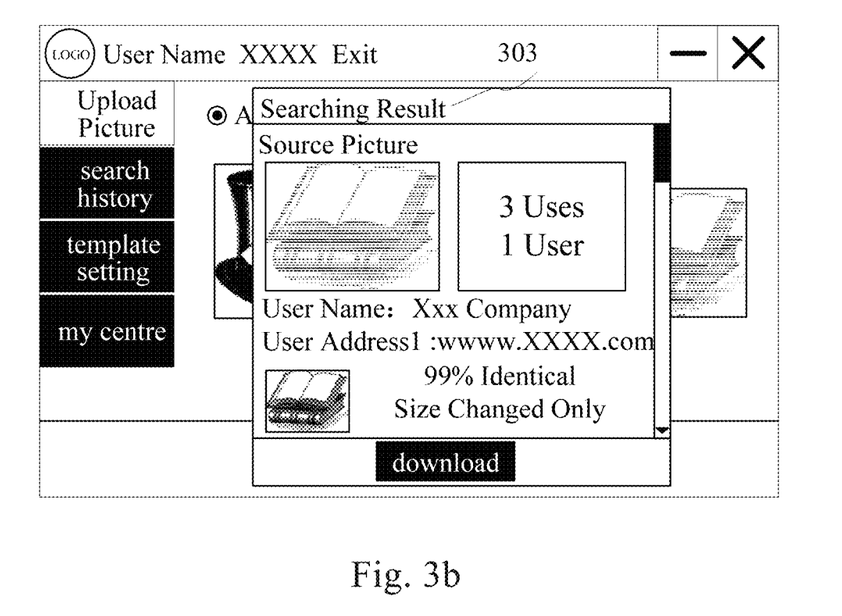

With further reference to FIGS. 3a to 3b, FIGS. 3a to 3b are schematic diagrams of an application scenario of the searching method according to the present embodiment. In the application scenario of FIG. 3a, first, the user uploads three target pictures in the display interface 301 of the search application installed by the client and clicks on the "start searching" button 302 in the display interface 301 to initiate the search request. After that, the background server providing support to the search application analyses each of the target pictures and extracts the text information and the image characteristics. Then, the background server searches for identical pictures of the three target pictures in sequence, determines that there is an identical picture matching with the third target picture, acquires the associated information of the identical picture, and sends the identical picture and the associated information as the search result to the client. Finally, the client presents the search result interface 303 based on the pattern in the default template.

By analysing the target picture in the search request to extract the text information and the image characteristic, matching the text information and the image characteristic of the target picture and the preset picture to determine the identical picture, and lastly acquiring the associated information of the identical picture and sending the identical picture and the associated information as the search result to the client so that the client may display the search result, the method provided by the embodiment of the present disclosure improves the search efficiency and reduces the labor cost of the search.

Figure 4:
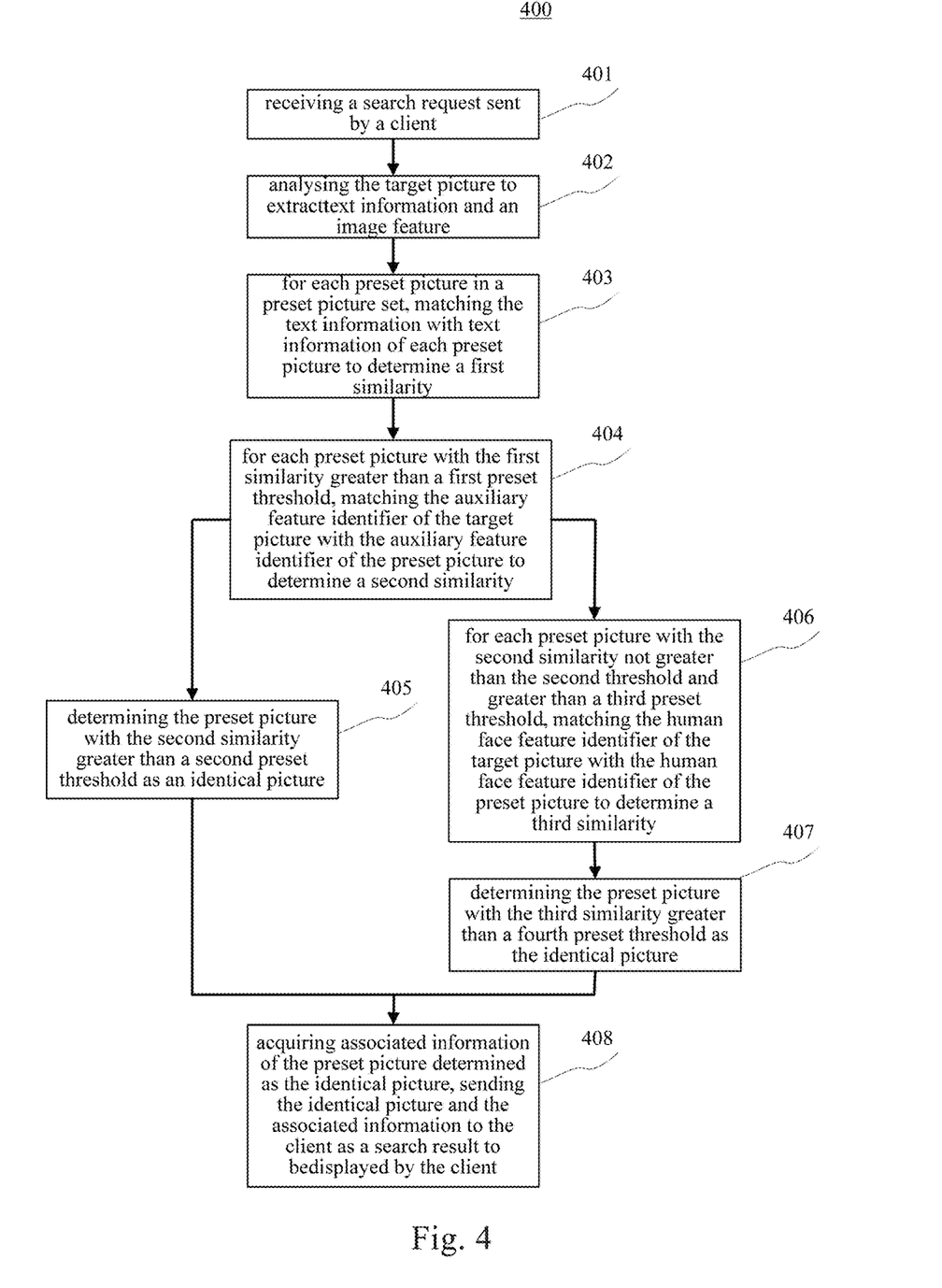
FIG. 4 is a flowchart of another embodiment of the searching method according to the present disclosure.

With further reference to FIG. 4, a flow 400 of another embodiment of the searching method is shown. The flow 400 of the searching method includes the following steps:

Step 401, receiving a search request sent by a client.

In the present embodiment, an electronic device (e.g., the server 105 as illustrated in FIG. 1) on which the search report generating method operate may acquire, by means of wired connection or wireless connection, receives a search request from a client used by the user for web browsing (e.g., the terminal devices 101, 102, 103 shown in FIG. 1), wherein the search request may include the target picture.

In the present embodiment, before receiving the search request sent by the client, the electronic device may also receive a user login request sent by the client, wherein the user login request may include a user identifier. After that, the electronic device may obtain history search information of the user indicated by the user ID, and send the history search information to the client. In practice, the user may click on the corresponding icon (such as the "search history" button, the uploaded picture) of the search application installed by the client so that the history search record of the client may be presented in the current interface.

Step 402, analysing the target picture to extract text information and an image characteristic.

In the present embodiment, the electronic device may analyse the target picture in a variety of ways, and extract the text information and the image characteristic. Wherein the text information may include characters, comments or its keywords, etc. in the target picture, and may also include character strings generated by analysing the target picture, for characterizing the content of the target picture; the image characteristic may include but is not limited to a color characteristic, a texture characteristic, a shape characteristic, a size characteristic, a spatial relationship characteristic, etc. In addition, the image characteristic may also include a human face characteristic, which may be used to characterize the presence of a human face, a skin color, etc.

In the present embodiment, the image characteristics of the target picture and the preset picture may be provided with an auxiliary characteristic identifier, wherein the auxiliary characteristic identifier includes at least one of the following: a color characteristic identifier, a texture characteristic identifier, a shape characteristic identifier, a size characteristic identifier and a spatial relationship characteristic identifier.

In the present embodiment, the image characteristics of the target picture and the preset picture may also be provided with a human face characteristic identifier, wherein the human face characteristic identifier may be used to distinguish the human face characteristics. In practice, the human face characteristic may be a character string composed of arbitrary characters, such as a character string composed of words "people", "no one", "white", "brown", etc. In addition, the image characteristics of the target picture and the preset picture may include at least one human face characteristic identifier.

Step 403, matching the text information with text information of each preset picture in the preset picture set to determine a first similarity.

In the present embodiment, the electronic device may first match the text information of the target picture with the text information of the preset picture in a set of preset pictures by using various similarity calculation methods (such as the cosine theorem, the Euclidean distance, the Jekard's similarity measure method, etc.), to determine the first similarity, i.e., the similarity between the text information of the target picture and the text information of the preset picture.

Step 404, for each preset picture with the first similarity greater than a first preset threshold, matching the auxiliary characteristic identifier of the target picture with the auxiliary characteristic identifier of the preset picture to determine a second similarity.

In the present embodiment, matching the image characteristic of the target picture with the image characteristic of each preset picture may be performed by calculating the coincidence rate of the auxiliary characteristic identifier of the picture to the auxiliary characteristic identifier of the preset picture, and determine the coincidence rate as the second similarity.

Step 405, determining the preset picture with the second similarity greater than a second preset threshold as an identical picture.

In the present embodiment, for each preset picture with the first similarity larger than the first preset threshold, in response to determining the second similarity of the preset picture and the target picture greater than the second preset threshold, the electronic device may determine the preset picture as the identical picture.

The specific operation of the step 401 to step 405 is substantially the same as that of the step 201 to step 203, therefore detailed description thereof is omitted.

Step 406, for each preset picture with the second similarity not greater than the second threshold and greater than a third preset threshold, matching the human face characteristic identifier of the target picture with the human face characteristic identifier of the preset picture to determine a third similarity.

In the present embodiment, for each preset picture with the second similarity not greater than the second threshold and greater than the third preset threshold, the electronic device may match the human face characteristic identifier of the target picture with the human face characteristic identifier of the preset picture. Specifically, the electronic device may calculate the coincidence rate of the human face characteristic identifier of the picture to the human face characteristic identifier of the preset picture, and determine the coincidence rate as the third similarity. Wherein the coincidence rate may be the ratio of the number of the identical auxiliary characteristic identifiers to the total number of the auxiliary characteristic identifiers of the preset picture.

Step 407, determining the preset picture with the third similarity greater than a fourth preset threshold as the identical picture.

In the present embodiment, for each preset picture with the second similarity not greater than the second threshold and greater than the third preset threshold, in response to determining the third similarity of the preset picture and the target picture greater than the fourth preset threshold, the electronic device may determine the preset picture as the identical picture.

Step 408, acquiring associated information of the identical picture, sending the identical picture and the associated information as a search result to the client so that the client displays the search result.

In the present embodiment, the electronic device may obtain the associated information of the identical picture determined in step 203, and send the identical picture and the associated information as a search result to the client so that the client displays the search result. Here, the associated information may include at least one of the following: the user name, the number of users, the usage address and the frequency of use of the identical picture.

The specific operation of the step 408 is substantially the same as that of the step 204, therefore detailed description thereof is omitted.

Figure 5:
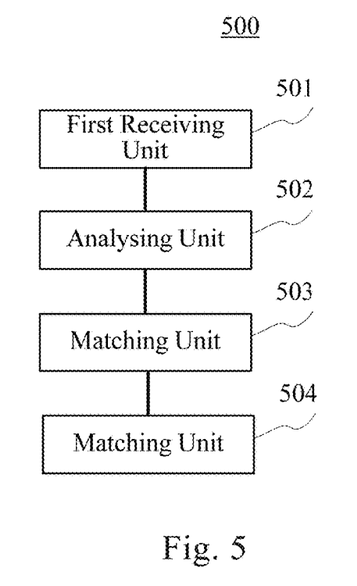
FIG. 5 is a schematic structural diagram of an embodiment of a searching apparatus according to the present disclosure.

With further reference to FIG. 5, as an implementation of the method shown in the above figures, the present disclosure provides an embodiment of a searching apparatus which corresponds to the method embodiment shown in FIG. 2. The apparatus may specifically be applied to various electronic devices.

As shown in FIG. 5, the apparatus 500 of the present embodiment includes: a receiving unit 501, configured to receive a search request sent by a client, wherein the search request includes a target picture; an analysing unit 502, configured to analyse the target picture to extract text information and an image characteristic; a matching unit 503, configured to match the text information with text information of each preset picture in a preset picture set to determine a first similarity, match the image characteristic with an image characteristic of the preset picture in response to the first similarity greater than a first preset threshold, and determine whether the preset picture is determined as an identical picture based on a matching result; first sending unit 504, configured to acquire associated information of the identical picture, send the identical picture and the associated information as a search result to the client so that the client displays the search result.

In the present embodiment, the receiving unit 501 of the searching apparatus 500 may, by means of wired connection or wireless connection, receives a search request from a client used by the user for web browsing (e.g., the terminal devices 101, 102, 103 shown in FIG. 1), wherein the search request may include the target picture.

In the present embodiment, the analysing unit 502 may analyse the target picture in a variety of ways, and extract the text information and the image characteristic. Wherein the text information may include characters, comments or keywords in the target picture, and may also include character strings generated by analysing the target picture, for characterizing the content of the target picture; the image characteristic may include but is not limited to a color characteristic, a texture characteristic, a shape characteristic, a size characteristic, a spatial relationship characteristic, etc.

In the present embodiment, the matching unit 503 may first match the text information of the target picture with the text information of the preset picture in a set of preset pictures by using various similarity calculation methods (for example, the cosine theorem, the Euclidean distance, the Jekard's similarity measure method, etc.), to determine the first similarity, i.e., the similarity between the text information of the target picture and the text information of the preset picture. After that, the electronic device may match the image characteristic of the target picture with the image characteristic of the preset picture by using various image characteristic matching methods (such as characteristic matching based on the local region grayscale statistics characteristic, or characteristic matching based on the Euclidean distance, the Mahalanobis distance, etc.) in response to the first similarity greater than the first preset threshold, and determine whether the preset picture is determined as an identical picture based on the matching result.

In some alternative implementations of the present embodiment, the image characteristic is provided with an auxiliary characteristic identifier, wherein the auxiliary characteristic identifier comprises at least one of the following: a color characteristic identifier, a texture characteristic identifier, a shape characteristic identifier, a size characteristic identifier; and the matching unit 503 may be further configured to, for each preset picture with the first similarity greater than the first preset threshold, match the auxiliary characteristic identifier of the target picture with the auxiliary characteristic identifier of the preset picture to determine a second similarity.

In some alternative implementations of the present embodiment, the matching unit 503 may be further configured to determine the preset picture with the second similarity greater than a second preset threshold as the identical picture.

In some alternative implementations of the present embodiment, the image characteristic may also be provided with a human face characteristic identifier; and the matching unit 503 may be further configured to, for each preset picture with the second similarity not greater than the second threshold and greater than a third preset threshold, match the human face characteristic identifier of the target picture with the human face characteristic identifier of the preset picture to determine a third similarity.

In some alternative implementations of the present embodiment, the matching unit 503 may be further configured to determine the preset picture with the third similarity greater than a fourth preset threshold as the identical picture.

In the present embodiment, the first sending unit 504 may obtain associated information of the identical picture determined by the matching unit 503 from a local database or a remote database storing the preset picture set, and send the identical picture and the associated information as a search result to the client so that the client displays the search result.

In some alternative implementations of the present embodiment, the associated information may include at least one of the following: a user name, number of users, a usage address, and frequency of use.

In some alternative implementations of the present embodiment, the searching apparatus 500 may further includes a second receiving unit and a second sending unit (not shown in the figure). The second receiving unit may be configured to receive a user login request sent by the client, wherein the user login request includes a user identifier; the second sending unit may be configured to obtain history search information of the user indicated by a user ID, and send the history search information to the client.

By the analysing unit 502 analysing the target picture in the search request received by the first receiving unit 501 to extract the text information and the image characteristic, then the matching unit 503 matching the text information and the image characteristic of the target picture and the preset picture to determine the identical picture, and lastly the first sending unit 504 acquiring the associated information of the identical picture and sending the identical picture and the associated information as the search result to the client so that the client may display the search result, the searching apparatus provided by the present disclosure improves the search efficiency and reduces the labor cost of the search.

Figure 6:
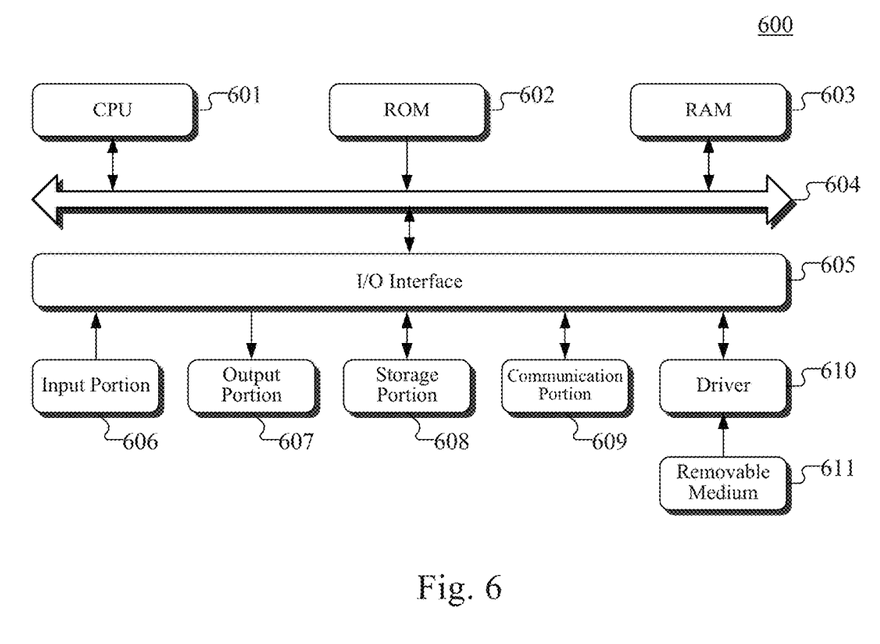
FIG. 6 is a schematic structural diagram of a computer system adapted to implement a terminal device or a server according to embodiments of the present disclosure.

Referring to FIG. 6, a schematic structural diagram of a computer system 600 adapted to implement a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present application.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an first receiving unit, a analysing unit, a matching unit and a first sending unit, where the names of these units or modules are not considered as a limitation to the units or modules. For example, the first receiving unit may also be described as "a unit for receiving a search request sent by a client."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: receiving a search request sent by a client, wherein the search request includes a target picture; analysing the target picture to extract text information and an image characteristic; matching the text information with text information of each preset picture in a set of preset pictures to determine a first similarity, and in response to a preset picture having the first similarity greater than a first preset threshold, matching the image characteristic with an image characteristic of the preset picture to determine whether the preset picture is an identical picture; and acquiring associated information of the preset picture determined as the identical picture, sending the identical picture and the associated information to the client as a search result to be displayed by the client.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A searching method, comprising:
    receiving a search request sent by a client, the search request including a target picture, and the search request being initiated by performing an operation on a displayed object;
    analysing the target picture to extract text information and an image characteristic of the target picture, wherein the image characteristic comprises an auxiliary characteristic identifier and a human face characteristic identifier, the auxiliary characteristic identifier comprising at least one of the following: a color characteristic identifier, a texture characteristic identifier, a shape characteristic identifier, a size characteristic identifier, a spatial relationship characteristic identifier;
    matching the text information with text information of each preset picture in a set of preset pictures to determine a first similarity between the text information of the target picture and the text information of the preset picture, and in response to the first similarity being greater than a first preset threshold, matching the image characteristic with an image characteristic of the preset picture to determine whether the preset picture is an identical picture, wherein, in response to the first similarity being greater than the first preset threshold, matching the image characteristic with the image characteristic of the preset picture to determine whether the preset picture is an identical picture comprises:
        for each preset picture having the first similarity greater than the first preset threshold, matching the auxiliary characteristic identifier of the target picture with the auxiliary characteristic identifier of the each preset picture to determine a second similarity between the auxiliary characteristic identifier of the target picture and the auxiliary characteristic identifier of the each preset picture, and determining the preset picture having the second similarity greater than a second preset threshold being the identical picture, and
        for each preset picture having the second similarity not greater than a second threshold and greater than a third preset threshold, matching the human face characteristic identifier of the target picture with the human face characteristic identifier of the preset picture to determine a third similarity between the human face characteristic identifier of the target picture and the human face characteristic identifier of the preset picture; and
    acquiring associated information of the preset picture determined as the identical picture, sending the identical picture and the associated information to the client as a search result to be displayed on the client, the associated information including use information of the preset picture on the Internet.

2. The searching method according to claim 1, wherein the determining whether the preset picture is the identical picture based on a matching result includes:

determining the preset picture having the third similarity greater than a fourth preset threshold being the identical picture.

3. The searching method according to claim 1, wherein the associated information includes at least one of the following: a user name, a number of users, a usage address, and a frequency of use.

4. The searching method according to claim 1, wherein before the receiving a search request sent by a client, the method further comprises:
receiving a user login request sent by the client, wherein the user login request includes a user identifier; and
obtaining historical search information of the user indicated by the user identifier, and sending the historical search information to the client.

5. A searching apparatus, the apparatus comprising:
at least one processor; and
a memory storing instructions, which when executed by the at least one processor, cause the at least one processor to perform operations, the operations comprising:
receiving a search request sent by a client, wherein the search request includes a target picture, and the search request being initiated by performing an operation on a displayed object;
analysing the target picture to extract text information and an image characteristic, wherein the image characteristic comprises an auxiliary characteristic identifier and a human face characteristic identifier, the auxiliary characteristic identifier comprising at least one of the following: a color characteristic identifier, a texture characteristic identifier, a shape characteristic identifier, a size characteristic identifier, a spatial relationship characteristic identifier;
matching the text information with text information of each preset picture in a set of preset pictures to determine a first similarity between the text information of the target picture and the text information of the preset picture, and in response to a preset picture having the first similarity being greater than a first preset threshold, matching the image characteristic with an image characteristic of the preset picture to determine whether the preset picture is an identical picture, wherein, in response to the first similarity being greater than the first preset threshold, matching the image characteristic with the image characteristic of the preset picture to determine whether the preset picture is an identical picture comprises:
for each preset picture having the first similarity greater than the first preset threshold, matching the auxiliary characteristic identifier of the target picture with the auxiliary characteristic identifier of the each preset picture to determine a second similarity between the auxiliary characteristic identifier of the target picture and the auxiliary characteristic identifier of the each preset picture, and determining the preset picture having the second similarity greater than a second preset threshold being the identical picture, and
for each preset picture having the second similarity not greater than a second threshold and greater than a third preset threshold, matching the human face characteristic identifier of the target picture with the human face characteristic identifier of the preset picture to determine a third similarity between the human face characteristic identifier of the target picture and the human face characteristic identifier of the preset picture; and
acquiring associated information of the preset picture determined as the identical picture, sending the identical picture and the associated information to the client as a search result to be displayed on the client, the associated information including use information of the preset picture on the Internet.

6. The searching apparatus according to claim 5, the operations further comprising:
determining the preset picture having the third similarity greater than a fourth preset threshold being the identical picture.

7. The searching apparatus according to claim 5, wherein the associated information includes at least one of the following: a user name, a number of users, a usage address, and a frequency of use.

8. The searching apparatus according to claim 5, the operations further comprising:
receiving a user login request sent by the client, wherein the user login request includes a user identifier; and
obtaining history search information of the user indicated by the user identifier, and sending the history search information to the client.

9. A non-transitory computer storage medium storing a computer program, which when executed by one or more processors, cause the one or more processors to perform operations, the operations comprising:
receiving a search request sent by a client, wherein the search request includes a target picture, and the search request being initiated by performing an operation on a displayed object;
analysing the target picture to extract text information and an image characteristic, wherein the image characteristic comprises an auxiliary characteristic identifier and a human face characteristic identifier, the auxiliary characteristic identifier comprising at least one of the following: a color characteristic identifier, a texture characteristic identifier, a shape characteristic identifier, a size characteristic identifier, a spatial relationship characteristic identifier;
matching the text information with text information of each preset picture in a set of preset pictures to determine a first similarity between the text information of the target picture and the text information of the preset picture, and in response to a preset picture having the first similarity greater than a first preset threshold, matching the image characteristic with an image characteristic of the preset picture to determine whether the preset picture is an identical picture, wherein, in response to the first similarity being greater than the first preset threshold, matching the image characteristic with the image characteristic of the preset picture to determine whether the preset picture is an identical picture comprises:
for each preset picture having the first similarity greater than the first preset threshold, matching the auxiliary characteristic identifier of the target picture with the auxiliary characteristic identifier of the each preset picture to determine a second similarity between the auxiliary characteristic identifier of the target picture and the auxiliary characteristic identifier of the each preset picture, and determining the preset picture having the second similarity greater than a second preset threshold being the identical picture, and
for each preset picture having the second similarity not greater than a second threshold and greater than a third preset threshold, matching the human face characteristic identifier of the target picture with the human face characteristic identifier of the preset picture to determine a third similarity between the human face characteristic identifier of the target picture and the human face characteristic identifier of the preset picture; and acquiring associated information of the preset picture determined as the identical picture, sending the identical picture and the associated information to the client as a search result to be displayed on the client, the associated information including use information of the preset picture on the Internet.

\* \* \* \* \*